United States Patent [19]
Seimiya et al.

[11] Patent Number: 5,294,309
[45] Date of Patent: Mar. 15, 1994

[54] ELECTRO-ABRASIVE POLISHING OF THE INNER SURFACE OF PIPES TO EXTRA-SMOOTH MIRROR FINISH

[75] Inventors: Kouichi Seimiya, Tsukuba; Keiichirou Asagawa, Ayase, both of Japan

[73] Assignees: Agency of Industrial Science and Technology, Tokyo; Miracle Company Limited, Ayase, both of Japan

[21] Appl. No.: 691,012
[22] PCT Filed: Oct. 30, 1990
[86] PCT No.: PCT/JP90/01389
  § 371 Date: Jun. 28, 1991
  § 102(e) Date: Jun. 28, 1991
[87] PCT Pub. No.: WO91/06388
  PCT Pub. Date: May 16, 1991

[30] Foreign Application Priority Data
Nov. 1, 1989 [JP] Japan .................................. 1-285259

[51] Int. Cl.⁵ .................................................. C25F 3/16
[52] U.S. Cl. ............................ 204/129.35; 204/129.46
[58] Field of Search ................. 204/129.35, 129.46, 204/217, 272

[56] References Cited

U.S. PATENT DOCUMENTS

| | | | |
|---|---|---|---|
| 4,294,673 | 10/1981 | Kimoto et al. | 204/129.46 |
| 4,632,740 | 12/1986 | Operschall et al. | 204/129.46 |
| 4,634,511 | 1/1987 | Operschall et al. | 204/272 X |
| 4,772,367 | 9/1988 | Menzel et al. | 204/272 X |

FOREIGN PATENT DOCUMENTS

| | | | |
|---|---|---|---|
| 5948398 | 4/1979 | Japan . | |
| 0137525 | 8/1983 | Japan | 204/129.46 |
| 59-227324 | 12/1984 | Japan . | |
| 62-157722 | 7/1987 | Japan . | |

OTHER PUBLICATIONS

Patent Abstracts of Japan, vol. 9, No. 209 (N-407)(1932), Aug. 27, 1985 & JP-A-60 071 122, Apr. 23, 1985.
Patent Abstracts of Japan, vol. 12, No. 120 (M-685)(2967), Apr. 14, 1988, & JP-A62 246 419, Oct. 27, 1987.
Patent Abstracts of Japan, vol. 7, No. 254 (N-255)(1399), Nov. 11, 1983, & JP-A-58 137 525, Aug. 16, 1983.

*Primary Examiner*—Donald R. Valentine
*Attorney, Agent, or Firm*—Oblon, Spivak, McClelland, Maier & Neustadt

[57] ABSTRACT

An electro-abrasive polishing process of the inner surface of pipes to an extra-smooth mirror finish comprises a preliminary-polishing process and a subsequent mirror-finishing process. The preliminary-polishing process is continued until the roughness of the inner surface of the small-diameter pipe is reduced to at least 0.5 μm Rmax or less by electro-abrasive polishing process of the inner surface of the small-diameter pipe by inserting a preliminary-polishing tool electrode comprising a core electrode wrapped with a non-woven nylon sheet in the small-diameter pipe to be polished and passing a small amount of current through the electrolyte between the small-diameter pipe that serves as the anode and the tool electrode that serves as the cathode and, at the same time, by mechanically polishing the inner surface of the small-diameter pipe by rotating the tool electrode and axially reciprocating it or the small-diameter pipe relative to each other. In the subsequent mirror-finishing process, similar polishing operations are repeated using a mirror-finishing tool electrode that comprises a core electrode wrapped with urethane sheet.

4 Claims, 5 Drawing Sheets

ELECTRO-ABRASIVE POLISHING OF THE INNER SURFACE OF PIPES TO EXTRA-SMOOTH MIRROR FINISH

FIELD OF THE INVENTION

In semiconductor and other industries, the need is increasing to pass very clean and pure pressurized fluid through passages. To provide such passages, demand for stainless steel pipes of relatively small diameter with extra-smoothly mirror finished inner surface is increasing steadily.

This inveniton relates to the electro-abrasive polishing process of the inner surface of pipes to such an extra-smooth mirror finish as is suited for the above described applicaiton.

DESCRIPTION OF THE PRIOR ART

Conventionally, pipes whose inner surface is finished by means of electro polishing process with a thin electrode positioned along their central axis have been favored as best-suited for the passing of very clean and/or pure pressurized fluids. But the roughness of their surface finish varies so greatly that the practically guarnateed surface roughness is approximately 0.7 $\mu$m Rmax at most. They involve other problems as well; such as reduction of wall thickness owing to much metal removal, costliness, and great susceptibility of finished surfaces to the aging of electrolyte and changes in the quality of pipe materials.

Meanwhile, the inventors proposed as electroabrasive polishing process of the inner surface of cylinders as per the Japanese Provisional Patent Publication No. 34227 of 1985.

This method uses a tool consisting of a rotating shaft of conductive material that is wrapped with a non-woven nylon sheet or other liquid-permeable elastic material which softly supports abrasive grains therearound. The tool is inserted in a cylinderical workpiece whose inner surface is electrolytically decomposed by a small amount of current passed through the electrolyte between the workpiece and the tool. Simultaneusly, the tool and workpiece are moved relative to each other, whereby the abrasive grains supported by the elastic material mechanically polish the inner surface of the workpiece. As the elastic material deforms in accordance with the internal contour of the cylinder, the abrasive grains are pressed against the inner surface without applying excessive pressure. Therefore, the inner surface of the cylinder is polished without deteriorating the accuracy of its profile, with the surface roughness reduced to below 0.2 $\mu$m Rmax usually and to approximately 0.1 $\mu$m under the most favorable conditions.

It has been desired to further improve the roughness of the inner surface of small-diamter pipe for passing pressurized fluids and other similar applications. But no methos have been proposed that can provide better surface roughness than the one just described.

SUMMARY OF THE INVENTION

An object of this invention is to provide an electro-abrasive polishing process of the inner surface of a pipe whose original roughness is approximately 3 $\mu$m Rmax to an extra-smooth mirror finish of the order of tens of nm.

Another object of this invention is to provide a method of achieving the above extra-smooth mirror finish with the use of a simple tool and equipment.

Yet another object of this invention is to provide a method of achieving the above extra-smooth mirror finish in an extremely short time by applying a quick pre-polishing and a subsequent mirror polishing process.

In order to achieve the above objects, an electroabrasive polishing process of the inner surface of pipes to an extra-smooth mirror finish according to this invention comprises two processes.

One is a preliminary-polishing process in which a tool electrode, which comprises a core electrode shaft and a non-woven nylon sheet to support abrasive grains and to wrap around the core electrode, is inserted in a small-diameter pipe that is to be worked, the small-diameter pipe serving as the anode and the tool electrode as the cathode. By passing a small amount of current between the anode and cathode in the electrolyte, the inner surface of the pipe is polished by the action of electrolytic decomposition. At the same time, the tool electrode is rotated and it or the pipe is axially moved back and forth relative to each other to perform mechanical polishing. This preliminary process is continued until the roughness of the inenr surface of the pipe becomes at least as fine as 0.5 $\mu$m Rmax.

The other is a subsequent mirror-finishing process which is carried out by use of a mirror-finishing tool electrode that comprises a core electrode wrapped with a sheet of urethane. The tool electrode, which serves as the cathode, is inserted in the small-diameter pipe that serves as the anode. By passing a small amount of current between the anode and cathode in the electrolyte containing free fine abrasive grains, the inner surface of the pipe is polished by the action of electrolytic decomposition. At the same time, the tool electrode is rotated and it or the pipe is axially moved back and forth relative to each other to achieve, in support of the action of the free fine abrasive grains in the electrolyte, the mechanical mirror polishing of the inner surface of the pipe.

The preliminary-polishing process may be achieved in several stages using several tools wrapped with non-woven nylon sheets comprising increasingly fine abrasive grains. Also, addition of free fine abrasive grains to the electrolyte is necessary to obtain the effect of the mechanical polish in the mirror-finishing process.

As is obvious from the above, the preliminary-polishing tool wrapped with a non-woven nylon sheet comprising abrasive grains performs electrolytic decomposition and the rotation of the tool and axial reciprocation of it or the small-diameter pipe relative to each other provide mechanical polishing in the preliminary-polishing process. In the subsequent mirror-finishing process, the mirror-finishing tool wrapped with an urethane sheet performs electrolytic decomposition and the rotation of the tool and axial reciprocation of it or the small-diamter pipe relative to each other in the electrolyte mixed with free fine abrasive grains provide mechanical polishing. As will be described later, these actions, in combination, are so effective that the original surface roughness of approximately 3 $\mu$m Rmax is reduced to an extra-smooth mirror finish of the order of tens of nanometer.

BRIEF DESCRIPTION OF THE DRAWINGS

FIGS. 1-A and -B are perspective views showing a preliminary-polishing tool electrode used in the preliminary-polishing process, in fabrication and on completion.

FIG. 1-C is a similar perspective view showing a finishing tool used in the subsequent mirror-finishing process.

FIGS. 8-A and 8B graphically show the surface roughness improvements achieved in a rough and an intermediate-polishing tests.

DESCRIPTION OF THE PREFERRED EMBODIMENTS

Pipes whose inner surface is polished by the method of this invention are generally stainless steel pipes of relatively small diameter falling below the diameter limit of approximately 150 mm. If necessary, preliminary machining is applied to the inner surface to obtain the desired interior roundness.

This invention of an extra-smooth mirror-finishing method comprises a preliminary-polishing process and a subsequent mirror-finishing process.

Figure 1A:
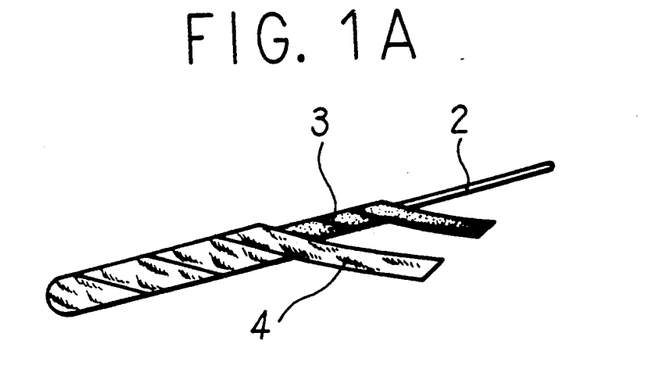
Figure 1B:
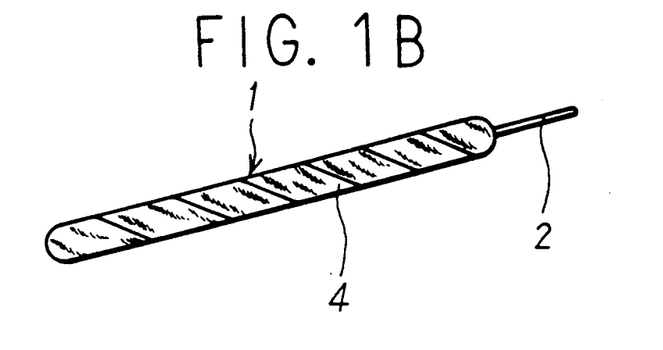

A preliminary-polishing tool electrode 1 used in the preliminary-polishing process comprises, as shown in FIG. 1-A, a core electrode 2 of stainless steel pipe or other similar material wrapped with a tape of elastic material 3, such as porous urethane, that readily passes the electrolyte. Then, a tape of non-woven nylon sheet comprising abrasive grains 4 is helically wrapped therearound, with both ends thereof affixed with adhesive as shown in FIG. 1-B. The urethane sheet may be replaced with other equivalent elastic materials that pass the electrolyte with equivalent ease.

The inner surface of pipes having relatively large inner diameters must be polished with higher accuracy in roundness. With the tool electrods for such pipes, the non-woven nylon ssheet 4 comprising abrasive grains may be wrapped directly around the core electrode of an appropriate outer diamter machined accurately. Then, the non-woven nylon sheet 4 must have such elasticity as will provide the desired working pressure.

The elasticity of the non-woven nylon sheet 4 changes somewhat with the lapse of time. To keep the tool electrode pressed against the inner surface of the pipe with a constant pressure, therefore, provision should preferably be made to expand the diamter of the electrode accordingly with time. More specifically, such provision may be obtained by employing the mechanism commonly used with the honing tool.

Preferably, the elastic material 3 should have a modulus of elasticity of less than 100 kPa, or preferably approximately 50 kPa, and an ability to pass a few liters of the electrolyte per minute when the tool electrode has a diameter of about 100 mm.

Figure 1C:
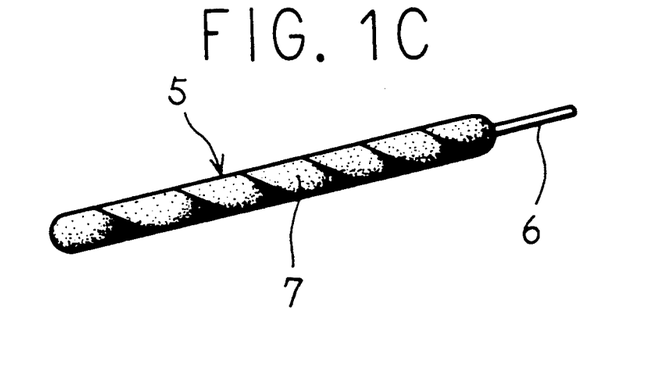

When two or more stages of rough and intermediate-polishing are applied in the preliminary polishing process, separate rough and intermediate-polishing tool electrodes must be prepared with their core electrodes wrapped first with the elastic material 3 and then with non-woven nylon sheets comprising abrasive grains of different sizes, such as, for example, #500 and #3000, affixed thereto by use of phenol resin or other bonds. Rough polishing is applied by use of the tool wrapped with a non-woven nylon sheet comprising coarser abrasive grains, and then intermediate polishing is given with the tool wrapped with a non-woven sheet comprising finer abrasive grains. A mirror-finishing tool electrode shown in FIG. 1-C, by contrast, comprises a similar core electrode 6 wrapped with a sheet of urethane 7 alone. The sheet of urethane 7 may be the same as that used with the tool electrode 1 for preliminary polishing.

When the inner surface of a pipe is polished, the entirety of the surface being worked is always in contact with the tool, so that the pressure with which the tool is pressed against the surface depends almost solely on the diameter of the tool. Accordingly, the diameter of the preliminary-polishing tool 1 and the mirror-finishing tool 5 must be determined with the working pressure taken into account. The working pressure, which depends on the area of contact between the inner surface of the pipe and the tool inserted therein, is usually set so that the working pressure is kept within an appropriate range, preferably between approximately 5 and 100 kPa. But the working pressure should by no means be limited to the above range.

In polishing, the tool electrode is rotated and it or the pipe is axially reciprocated relative to each other. The reciprocation provides such a large angle of intersection to the traces of the abrasive grains that prevents the generation of deep circular steaks, significantly increases surface smoothness, and averages the longitudinal unevenness in surface finish that results from the uneveness in the surface condition of the polishing tool.

Figure 2:
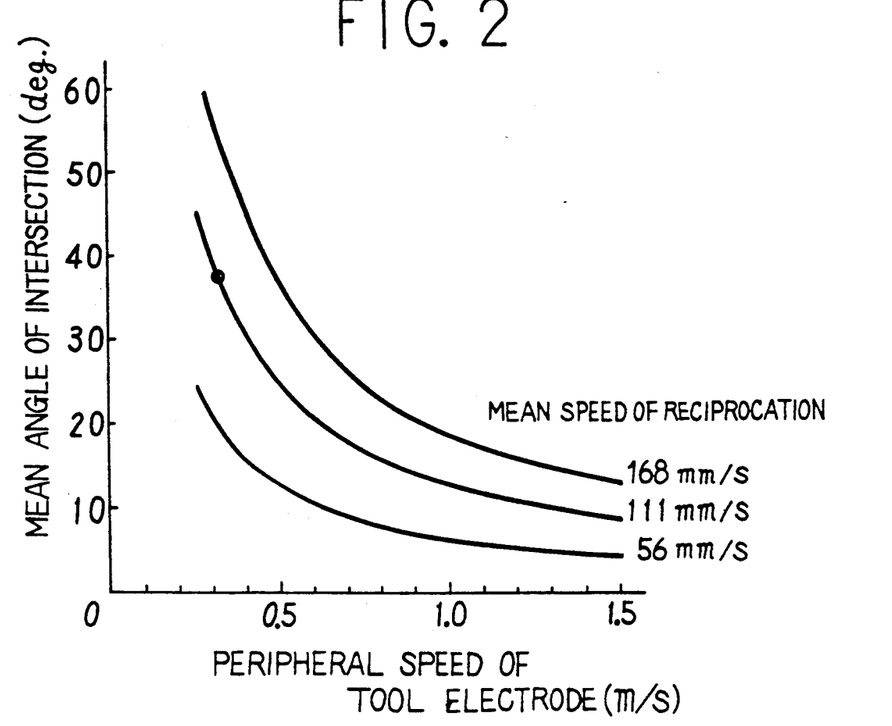
FIG. 2 graphically shows the relationship between the peripheral speed and mean angle of intersection of the abrasive grains.

The tool or small-diameter pipe should be preferably be axially reciprocated relative to each other at such a speed as will provide a mean angle of intersection of at least 2 degrees to the traces of the abrasive grains on the inner surface of the pipe. Preferably, the mean angle of intersection must be approximately between 5 and 6 degrees. To choose an appropriate mean angle of intersection, it is necessary to either lower the speed of the rotation or increase the speed of the axial reciprocation, which might result in lower polishing efficiency and some other problems. Therefore, the mean angle of intersection is set within the limits where no such problems arise. FIG. 2 shows the relationship between the peripheral speed of the tool electrode and the mean angle of intersection at different mean speeds of reciprocation.

In electrolytic metal removal process, it is generally preferred to supply the electrolyte at a high flow rate. When the tool electrode is inserted in the small-diameter pipe, however, little electrolyte flows down through the gap left therebetween even if provision is made to let the electrolyte fall by gravity from one end of the vertically disposed pipe. As such, it is possible for the electrolyte staying in the gap to exert an adverse influence on the polishing operation. To avoid this problem, it is necessary to stop the feed of the electrolyte for replacement after supplying for about 30 seconds or apply a pulsed current. But such considerations are unnecessary when the electrolyte is forcibly fed under pressure. Particularly when the pipe is long, forced feed of the electroly seems indispensable. Then, it is preferable to use pipe as the core electrodes 2 and 6 so that the electrolyte fed therethrough flows out through a hole that is appropriately provided in an area wrapped with the non-woven nylon sheet 4 or urethane sheet 7.

Electrolytic metal removal process is performed by passing a small amount of current through the electrolyte between the small-diameter pipe that serves as the anotde and the preliminary-polishing tool electrode 1 or mirror-finishing tool electrode 5 that serves as the cathode. At the same time, as mentioned previously, the tool electrode is rotated and it or the pipe is axially reciprocated relative to each other. In the mirror-finishing process following the preliminary-polishing process, free fine abrasive grains may be added to the electrolyte to achieve more effective mechanical mirror polishing by taking advantage of their abrasive action. The size of the free abrasive grains should preferably be approximately #10000. The concentration of the abrasive grains needs not be higher than 1 percent. If the precipitation in the electrolyte circulation system is negligible, 0.5 percent is enough.

There is a practical demand to finish the electrolytic preliminary polishing in one pass of 2 to 3 minutes. But it is safe not to increase the current up to the vicinity of the critical current density where the surface roughness increases rapidly as a result of pit generation. As the surface roughness increases rapidly in some portions at 0.5 A/cm$^2$, the current density must be set between 0.1 and 0.4 A/cm$^2$, or preferably below 0.3 A/cm$^2$ to provide a margin of safety.

The deviation of the core electrode from the central axis of the small-diameter pipe and the pressure with which the tool electrode is pressed against the inner surface of the pipe have a great influence on the critical current density. The local variation in interelectrode resistance that arises when the tape comprising abrasive grains is wound nonuniformly also has an influence. If these shortcomings are improved, it becomes possible to increase the polishing current density to approximately 0.5 A/cm$^2$ and thereby increase the polishing speed in the preliminary polishing process. The application of pulsed current, on the other hand, permits dispensing with the downtime needed for the re-soaking of the electrolyte and also increasing the critical current density.

Within the above-described low current density limit in a steady state used in polishing, most of the anode current is consumed in the formation of a passive film and the generation of gases. Thus making little contribution in the form of electrolytic elution through the ionization of the anode metal, the anode current has practically no current efficiency. When the base metal is exposed as the film is rubbed away by the abrasive grains, the current efficiency instantaneously jumps close to 100 percent. But the film formed again thereafter after grows thicker with time, whereby the current efficiency drops logarithmically towards a steady state. But as the removal of the film by the abrasive grains is repeated, the time-averaged current density in the raised portions of the surface is kept at as high a percentage as of the order of tens. Meanwhile, the current density in the depressed portions of the surface is kept very low. As a consequence, the actions of the abrasive grains and the electrolytic elution produce such a multiplied result that the surface is rapidly made smooth without necessitating great material removal.

Generally, effective switching from the preliminary-polishing process with the non-woven nylon sheet 4 to the subsequent mirror-finishing process with the urethane sheet 7 is achieved after the roughness of the inner surface of the small-diameter pipe has fallen below 0.5 $\mu$m Rmax or preferably below 0.2 $\mu$m. When switched at such a point, efficient mirror-polishing can be accomplished by making effective use of the features of the two processes.

By referring to FIGS. 3 to 5, apparatus for implementing the electrolytic extra-smooth mirror polishing according to this invention will be described in the following.

Figure 3:
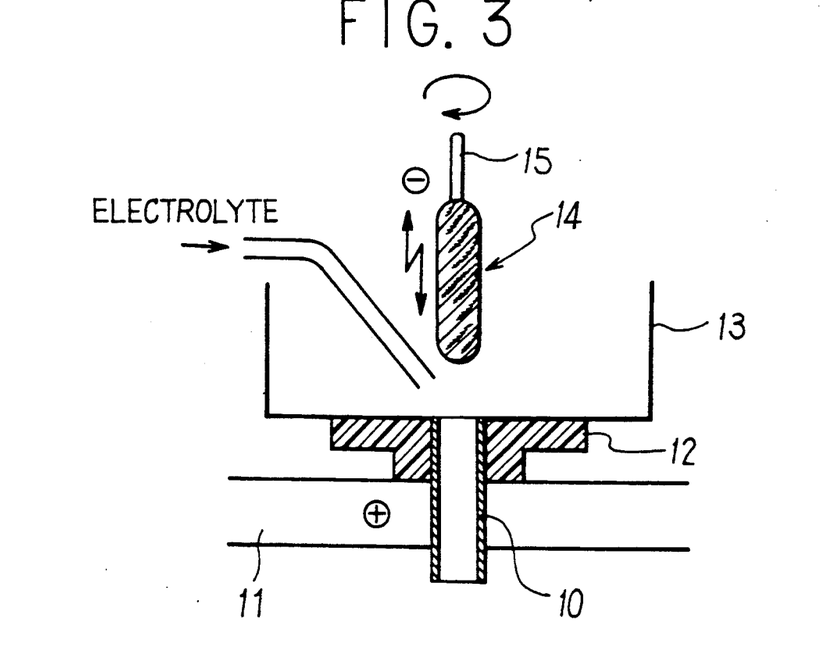
FIG. 3 is a schematic cross-sectional view showing an apparatus used in implementing the method of this inveniton.

FIG. 3 shows an apparatus suited for polishing the inner surface of shorter small-diameter pipes. Reference numeral 10 designates a small-diameter pipe whose inner surface is to be polished. A holder 11 keeps the pipe 10 in a vertical position, with a plastic guide 12 holding one end of the pipe 10 in contact with the bottom of an electrolyte resservoir 13. A tool electrode 14 is of the type illustrated in FIGS. 1-A and 1-B. A core electrode 15 is adapted to be connected to a rotating and axially reciprocating device not shown. The tool electrode 14 and the small-diameter pipe 10 are respectively connected to the cathode and the anode of a power supply unit not shown so that a current for electrolytic decomposition is passed between the tool electrode 14 and the pipe 10.

In the preliminary-polishing process, tool electrodes 14 covered with increasingly fine-textured materials are used as described previously. In the subsequent mirror-finishing process, similar electrolytic and mechanical polishing are performed with a mirror-finishing tool electrode 5 of the type shown in FIG. 1-C and free fine abrasive grains added to the electrolyte.

To polish a large number of pipes at a time, provision should be made to hold and reciprocate the desired number of pipes in the polishing space.

Figure 4:
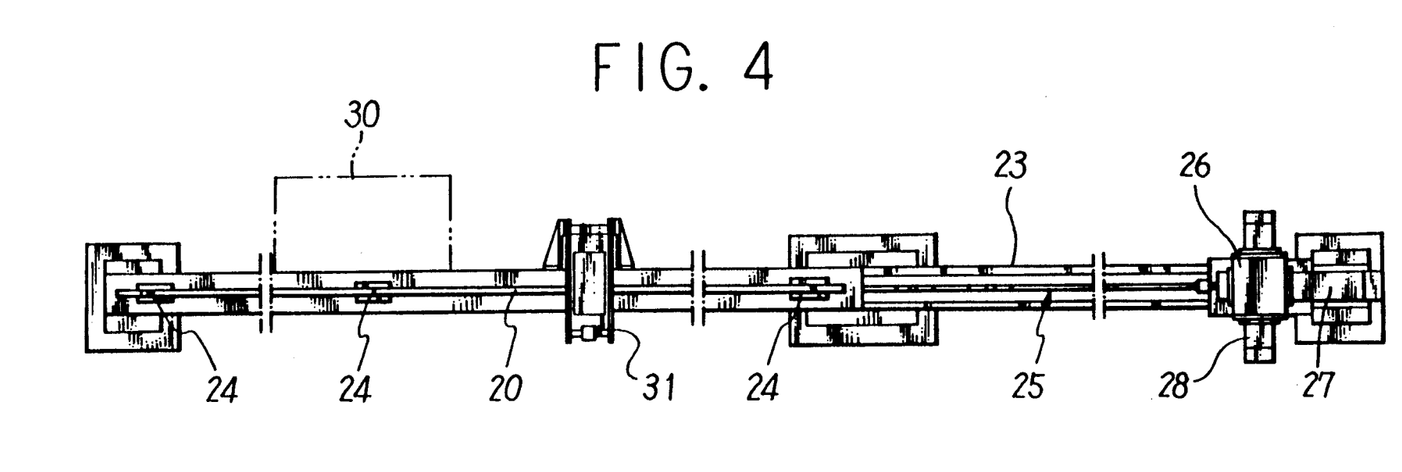
FIGS. 4 and 5 are plan and front views showing another apparatus.
Figure 5:
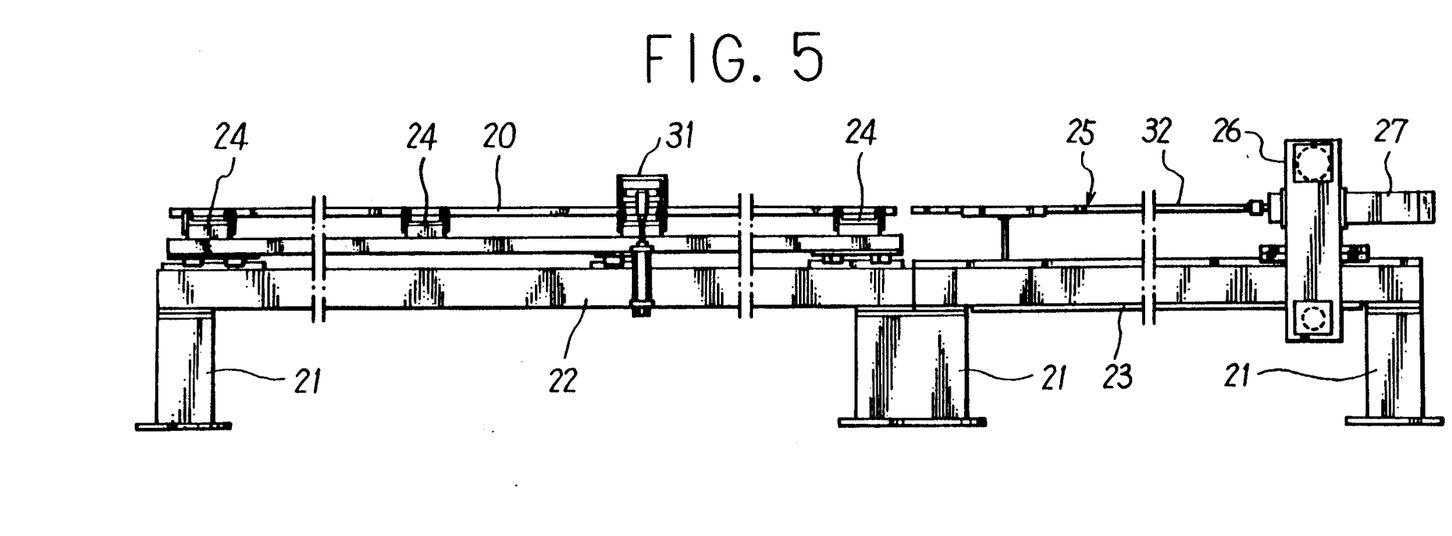

An apparatus shown in FIGS. 4 and 5 is suited for polishing the inner surface of small-diameter pipes of such greater length as, for example, 4 m. On beds 22, 23 supported on legs 21 are mounted supports 24 that support portions of a small-diameter pipe 20 held in a horizontal position and a tool stand 26 that aligns and connects a tool electrode 25 to the small-diameter pipe 20. The tool stand 26 is slidable in the direction of the axis of the small-diameter pipe 20 over the bed 23. The tool stand 26 is equipped with a motor 27 that rotates the tool electrode 25 and a motor 28 that moves the tool stand 26 itself along the axis of the small-diameter pipe.

A reciprocating device 30 that moves back and forth the small-diameter pipe 20 along the axis thereof is mounted on the bed 22. The reciprocating device 30 may be a device that holds and moves the small-diameter pipe 20 in the direction of the axis thereof, or a pair of rotating rollers that hold the small-diameter pipe 20 therebetween and moves it by the rotation of the rollers, or other some other appropriate devices. Also, a mechanism to slowly rotate the small-diameter pipe may be attached to the reciprocating device so that the pipe rotatably placed on the supports 24 is rotated while being polished. Reference numeral 31 denotes a mechanism that holds the small-diameter pipe 20 in position. It is also possible to provide a device to slowly rotate the small-diameter pipe 20 to the holding mechanism 31.

This apparatus has a long rod 32 that serves as the core electrode of the tool electrode 25. The motor 27 rotates the rod 32 so that the small-diameter pipe 20 is axially fed at a constant speed, whereas the reciprocating device 30 moves the small-diameter pipe 20 back and forth along the axis thereof. But the tool stand 26 may be designed to perform two functions of constant-speed feed and reciprocation. Basically it is preferable to pass the tool electrode 25 through the small-diameter pipe 20 from one end to the other end thereof to complete polishing in a single pass. But provision may be also made to reciprocate the tool electrode 25 as required.

When the small-diameter pipe is held in a horizontal position as in the apparatus being described, circumferential unevenness can be eliminated by slowly rotating the pipe being polished. When the small-diameter pipe is held in a vertical position as shown in FIG. 3, on the other, there is no need to slowly rotate the pipe because the gases resulting from the electroabrasive decomposition escapes so readily as to permit even polishing throughout the entire circumference of the inner surface thereof.

When polishing is completed in one pass as mentioned previously, the tool electrode 25 may be of a composite type that is wrapped with tapes of rough- and medium-textured non-woven nylon sheets and of urethane sheet for mirror finishing in that order from the leading end thereof. Or otherwise, the same small-diameter pipe may be polished in steps on different polishing apparatuses employing different tool electrodes individually wrapped with such different tapes.

The tool electrod 25 and the small-diameter pipe 20 are respectively connected to the cathode and anode of a power supply unit not shown. The electrolyte is supplied under pressure either from one end of the small-diameter pipe 20 or through the core electrode of the tool electrode 25.

EXAMPLE

Now an example of implementing the method of this invention will be described in the following paragraphs.

In this example, a rough, an intermediate-polishing and a mirror-finishing tool electrode of the types shown in FIGS. 1-A, 1-B and 1-C were used.

Bright annealed stainless steel pipe having an outer diameter of 6.35 mm, a wall thickness of 1 mm and a length of 35 mm (of JIS SUS 316L type, with an inner surface area of approximately 4.8 cm$^2$) was used. Rough and intermediate polishing were performed with tool electrodes each of which consisted of a stainless steel pipe having an outer diameter of 2 mm and helically wrapped with tapes of urethane and non-woven nylon sheet comprising abrasive grains, with both ends thereof bonded firmly, until the outer diameter became approximately 5 mm. The tool electrode for mirror-finishing consisted of a similar stainless steel pipe wrapped with urethane alone.

Polishing was carried out using the above tools that were attached to the spindle of a polishing machine remodeled from a drilling machine as shown in FIG. 3. The work-piece was rotated 23 times per second and reciprocated with a frequency of 7 Hz over a distance of 8 mm. The circle in FIG. 2 indicates the resulting mean angle of intersection.

As practically no electrolyte falls through the gap between the small-diameter pipe and the tool, the polishing spacers was descended at intervals of 30 seconds to separate the tool away from the small-diameter pipe for a short period of time (approximately 12 seconds) to allow the re-soaking of the electrolyte. A 20 percent aqueous solution of sodium nitrate ($NaNo_3$) was used as the electolyte.

Figure 6:
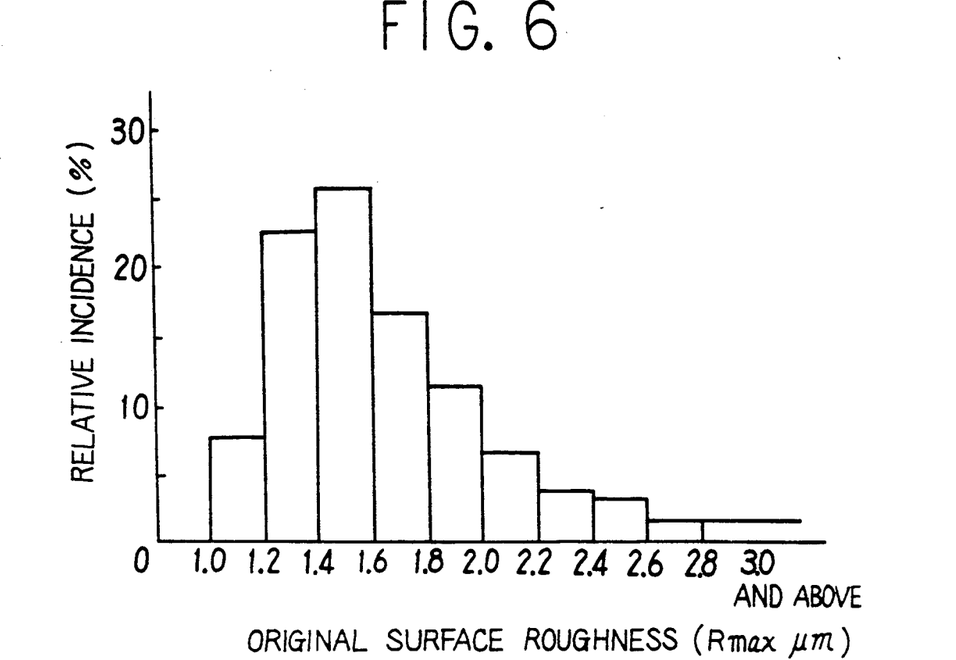
FIG. 6 graphically shows the distribution of roughness of the inner surface of an unprocessed pipe.

There are many small pits over the inner surface of the bright annealed stainless steel pipe to be polished, and the depth of the pits governs the original roughness of the inner surface. FIG. 6 shows the distribution of surface roughness Rmax (cut off at 0.8 mm) derived from a roughness profile curve (which was drawn on the basis of as many data as 630). The surface roughness was measured with Talysurf Type 5 made by Rand Taylor Hobson. When the presence of surface defects is neglected, it is therefore enough to remove the material by approximately 3 $\mu$m with the non-woven nylon sheet comprising abrasive grains of #500 in the first rough polishing process.

Figure 7:
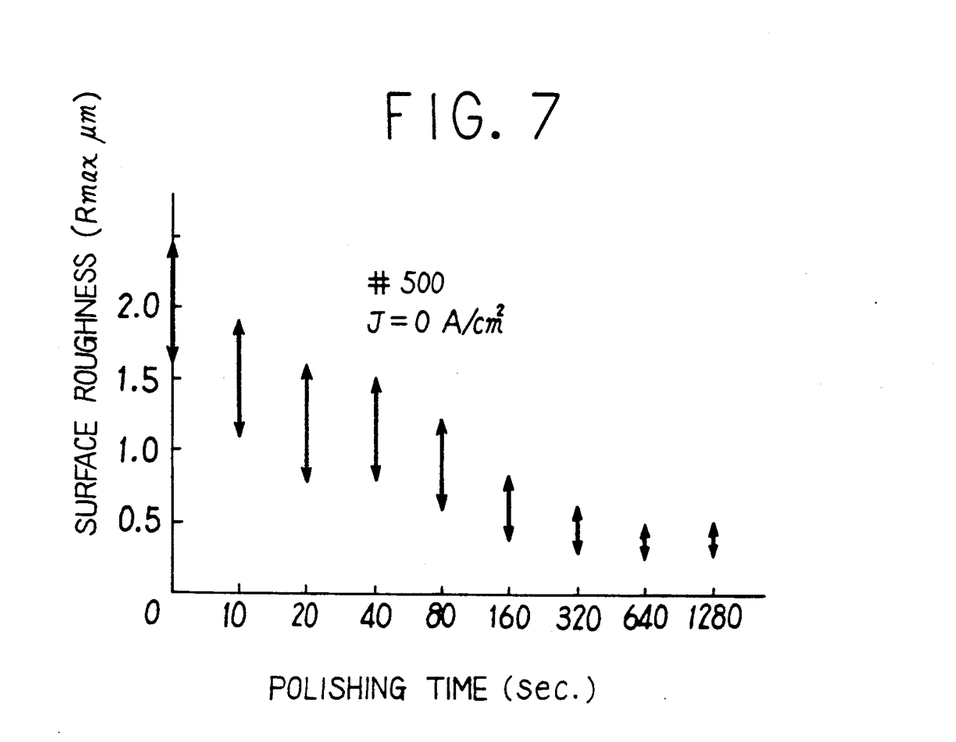
FIG. 7 shows how the original surface roughness is improved by a non-woven nylon sheet comprising abrasive grains of #500.

As is obvious from FIG. 7, which shows how far the original surface roughness is improved by the rough-polishing with the non-woven nylon sheet comprising abrasive grains of #500, the surface roughness was reduced to a minimum level in about 10 minutes.

Figure 8A:
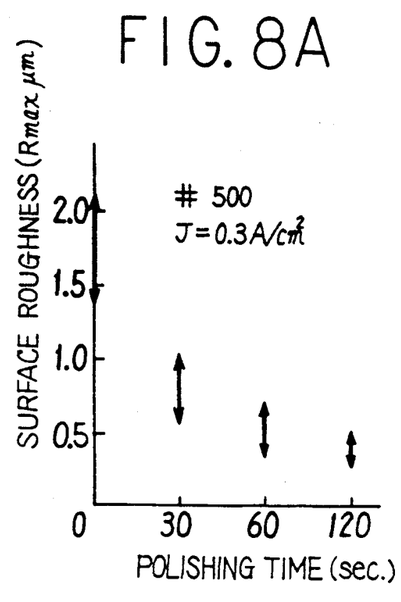
Figure 8B:
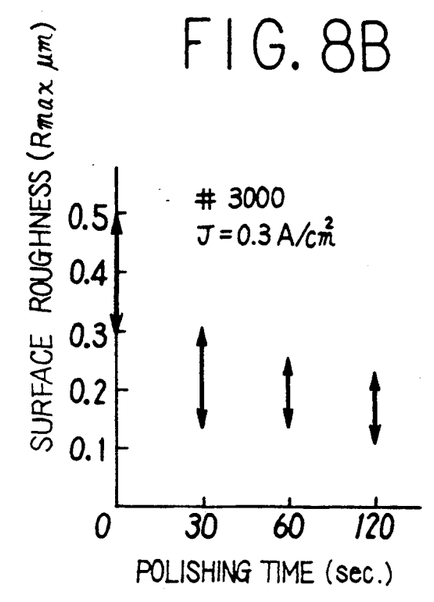

FIGS. 8-A and 8-B show the surface roughness improvements (cut off at 0.25 mm) achieved in the rough and intermediate polishing processes that were carried out for a period of 2 minutes each, with a current density of 0.3 A/cm$^2$. As the same specimen was used in the rough and intermediate polishing processes, the surface roughly polished with the non-woven nylon sheet comprising abrasive grains of #500 served as the original surface for the intermediate polishing with the non-woven nylon sheet comprising abrasive grains of #3000.

From the observation of the roughness profile curves representing the surfaces polished with the non-woven nylon sheets comprising abrasive grains of #500 and #3000, it became obvious that the polished inner surface of the small-diameter pipe comprises a large number of abraded grooves having considerably large angles of intersection. Apparently, the deepest abraded grooves govern the roughness, Rmax, of the polished surface.

Figure 9:
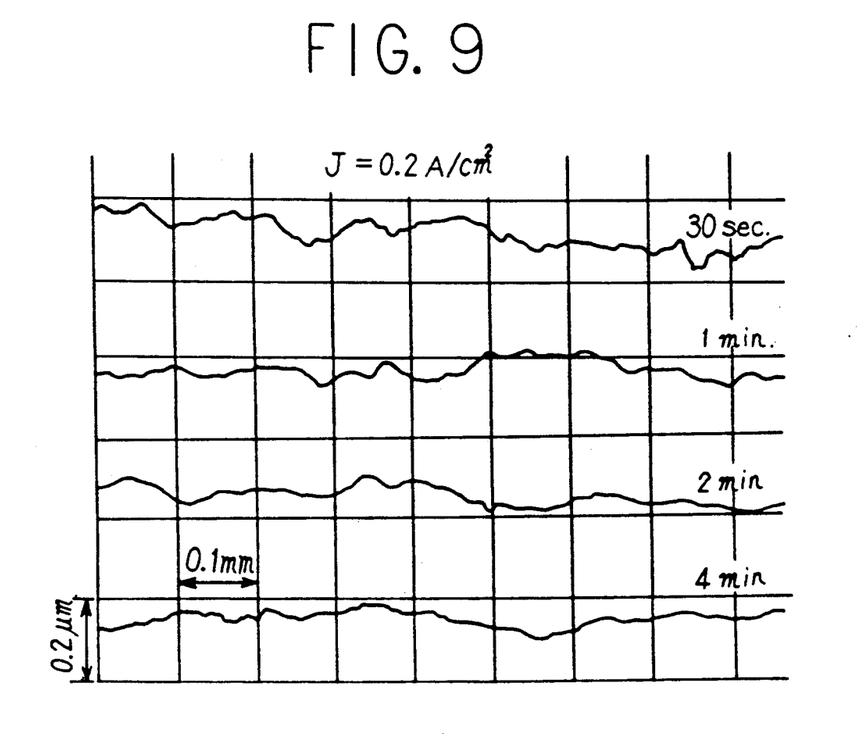
FIG. 9 graphically shows how the surface roughness changes with time when mirror-polishing is applied with a finishing tool electrode wrapped with an urethane sheet.

FIG. 9 shows how the surface roughness profile curve changes with time in the mirror-finishing process in which the urethane-wrapped tool electrode is used (magnification: 20,000 times longitudinally and 100 times transversely). The size of the abrasive alumina grains added to the electrolyte (a 20 percent aqueous solution of sodium nitrate ($NaNO_3$)) averaged a little under 1 $\mu$m.

While the center-line mean roughness Ra falls below the lowest scale of the roughness gauge in one or two minutes, Rmax ceases to exhibit any apparent change in two minutes. At this level of minuteness, it becomes difficult to distinguish between microscopical surface undulation and surface roughness. Therefore, it becomes necessary to rearrange the data by cutting off at an appropriate point as needed by object and application. If the data is cut off at 0.25 mm, the value of the obtainable Rmax is 0.03 $\mu$m at best and 0.05 $\mu$m on average.

By applying the electrolytic extra-smooth mirror polishing method of this invention to the inner surface of a bright annealed stainless steel pipe having an inner diameter of 4.35 mm, the original surface roughness of approximately 3 μm Rmax was reduced to an extra-smooth mirror finish of approximately 0.05 μm. Two minutes each were consumed for the rough and intermediate polishing with the non-woven nylon sheets comprising abrasive grains of #500 and #3000 and the mirror-finishing process with the urethane sheet. As there is practically no flow of the electrolyte, operation of each process must be stopped three times for some 30 seconds in total to permit the re-soakin of the electrolyte. This results in the total polishing time of a little less than 8 minutes, which is economically acceptable when the ease with which more efficient multi-spindle operation can be introduced is taken into consideration.

FEASIBILITY OF INDUSTRIAL APPLICATION

As is obvious from the above, the method of this invention provides an extra-smooth mirror finish to the inner surface of stainless steel pipes that is needed in chemical, food processing, nuclear, biological and many other sectors of industry. Of course, the method is applicable to the polishing of the inner surface of pipes of not only stainless steel but also aluminum, titanium, copper, ferro-alloys and many other metals.

REFERENCE CHARACTERS USED IN THE DESCRIPTION

1. Preliminary-polishing tool electrode
2. Core electrode
3. Elastic material
4. Non-woven nylon sheet
5. Mirror-finishing tool electrode
6. Core electrode
7. Urethane sheet
10. Small-diameter pipe
11. Holder
12. Guide
13. Electrolyte reservoir
14. Tool electrode
15. Core electrode
20. Small-diameter pipe
21. Leg
22,23. Beds
24. Support
25. Tool Electrode
27. Motor
28. Moving motor
30. Reciprocating device
31. Holding mechanism
32. Rod

What is claimed is:

1. An electro-abrasive polishing process of the inner surface of a small-diameter pipe to an extra-smooth mirror finish which comprises:

a preliminary-polishing process in which the roughness of the inner surface of the small-diameter pipe is reduced to at least 0.5 μm Rmax or under by electroabrasive polishing process of the inner surface of the small-diameter pipe by inserting a preliminary-polishing tool electrode comprising a core electrode wrapped with a non-woven nylon sheet comprising abrasive grains in the small-diameter pipe to be polished and passing a small amount of current through the electrolyte between the small-diameter pipe that serves as the anode and the tool electrode that serves as the cathode and, at the same time, by mechanically polishing the inner surface of the small-diameter pipe by rotating the tool electrode and axially reciprocating it or the small-diameter pipe relative to each other; and a subsequent mirror finishing process in which the inner surface of the small-diameter pipe is polished to a mirror finish by electro-abrasive polishing process of the inner surface of the small-diameter pipe by inserting a mirror-finishing tool electrode comprising a core electrode wrapped with an urethane sheet in the small-diameter pipe to be polished and passing a small amount of current through the electrolyte containing free fine abrasive grains between the small-diameter pipe that serves as the anode and the tool electrolde that serves as the cathode and, at the same time, by mechanically polishing the inner surface of the small-diameter pipe by rotating the tool electrode and axially reciprocating it or the small-diameter pipe relative to each other, in conjunction with the action of the free fine grains contained in the electrolyte.

2. An electro-abrasive polishing process of the inner surface of a small-diameter pipe to an extra-smooth mirror finishing according to claim 1, in which the preliminary-polishing process is carried out in steps using multiple preliminary-polishing tool electrodes wrapped with increasingly fine-textured non-woven nylon sheets.

3. An electro-abrasive polishing process of the inner surface of a small-diameter pipe to an extra-smooth mirror finish accroding to claim 1, in which the tool electrodes used in the preliminary-polishing and mirror-finishing processes have such diameter that the tools ar pressed against the inner surface of the small-diameter pipe to be polished with a pressure of 5 to 100 kPa when inserted therein.

4. An electro-abrasive polishing process of the inner surface of a small-diameter pipe to an extra-smooth mirror finish according to claim 1, in which the tool electrodes are rotated and they or the small-diameter pipes are axially reciprocated relative to each other at such speed that the traces of the abrasive grains on the inner surface of the small-diameter pipe has a mean angle of intersection of at least 2 degrees.

* * * * *